United States Patent
Comeau

[15] 3,679,859
[45] July 25, 1972

[54] SPOT WELDING TOOL

[72] Inventor: Raymond J. Comeau, 41 High Rock St., Lynn, Mass. 01902

[22] Filed: July 20, 1971

[21] Appl. No.: 164,358

[52] U.S. Cl. .................................................. 219/90
[51] Int. Cl. ................................................. B23k 11/28
[58] Field of Search ........................................ 219/90

[56] References Cited

UNITED STATES PATENTS 2,749,417  6/1956  Griskell ......................... 310/90
1,489,458  4/1924  Petersen ....................... 219/90 X

FOREIGN PATENTS OR APPLICATIONS 421,019  12/1934  Great Britain ..................... 310/90

*Primary Examiner*—J. V. Truhe
*Assistant Examiner*—B. A. Reynolds
*Attorney*—Arthur E. Dowell, Jr. et al.

[57] ABSTRACT

The spot welding tool is of pliers type and has a pair of crossed drill rod handles pivotally connected together. A solid jaw is carried by one drill rod and a movable jaw pivotally connected to the other drill rod. A pair of opposed copper electrodes are carried by the jaws respectively with means for adjusting the gap between the ends of the electrodes. A pin of substantial diameter is mounted on the solid jaw snugly engaging a corresponding bore in the movable jaw. A spring is disposed around the pin between said jaws yieldably tending to separate the jaws, whereby when the handles are squeezed together the movable jaw will move in parallel relation to the solid jaw allowing the electrodes to close over the work evenly.

7 Claims, 3 Drawing Figures

PATENTED JUL 25 1972

3,679,859

INVENTOR
RAYMOND J. COMEAU

BY *Alexander Towell*

ATTORNEYS

SPOT WELDING TOOL

DESCRIPTION OF INVENTION

This invention relates to spot welding tools, and the principal object thereof is to provide a hand tool of the pliers type adapted to be placed over two pieces of metal to be welded and squeezed together by the handles, in making a spot weld. Copper electrodes attached to the solid and movable jaws of the tool at their outer ends and then clamped by means of Allen bolts on each jaw of the tool; and the cables from a welder are then attached to the copper electrodes, whereupon the hand tool is set up to spot weld. Teflon sleeves are provided around each electrode for insulation purposes, and rubber insulation is applied on handles of the tool for safety precautions. A spring between the two jaws sliding on a dowel pin normally keeps the gap between the electrodes open, and yieldably maintains the gap for which the copper electrodes are set. The tool may then be placed over two pieces of metal, and by squeezing the handles a pivot section of the movable jaw allows the movable jaw to move toward the solid jaw in a parallel direction, allowing the electrodes to close over the metal evenly.

A further object of the invention is to provide a tool which is designed to make work a lot easier for the worker, as existing spot welding machines are stationary machines usually attached to a work bench, so that when the worker has to spot weld he must lift his work on top of the bench. My hand tool does the same job as the spot welding machine but eliminates the lifting of any work. The cables from the electric welder plug right into the jaws of my hand tool and all the welder has to lift is a hand tool which is a lot lighter and easier to work with than the old welding machines.

My tool is designed so that it can be put down on a metal surface without being activated electrically.

I will explain the invention with reference to the accompanying drawing, which illustrates one practical embodiment thereof, to enable others familiar with the art to adopt and use the same; and will summarize in the claims the novel features of construction, and novel combinations of parts, for which protection is desired.

Figure 2:
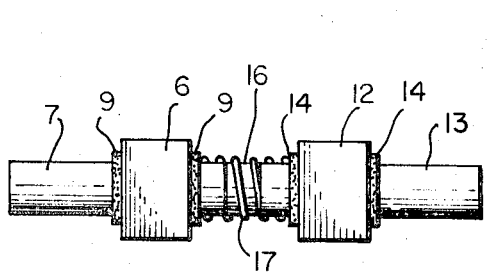
FIG. 2 is an end elevation thereof looking at the electrode end.
Figure 1:
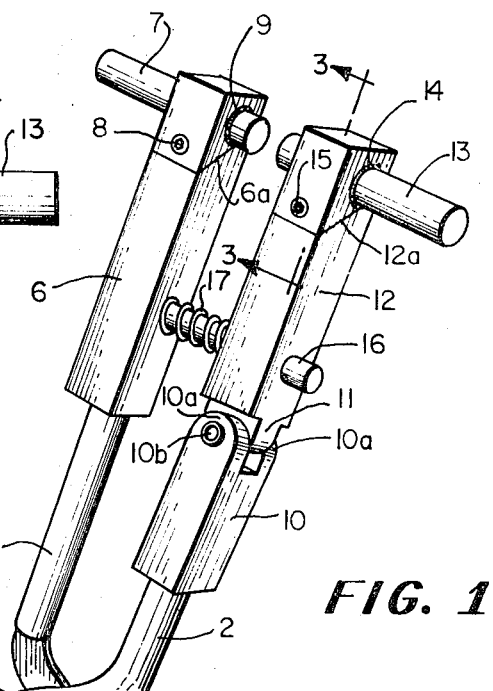
FIG. 1 is a perspective view of my spot welding hand tool.

My novel tool comprises a pair of drill rods 1 and 2, each having handles 1a and 2a respectively which are offset from the drill rods, as shown in FIG. 1, and which cross as shown, the handles being pivotally connected together by a loose rivet 3 so as to permit the drill rods 1 and 2 to be drawn together or separated as the handles 1a and 2a are drawn together or separated. The handles 1a and 2a are preferably covered with rubber insulation 4 and 5 respectively, for safety purposes.

Figure 3:
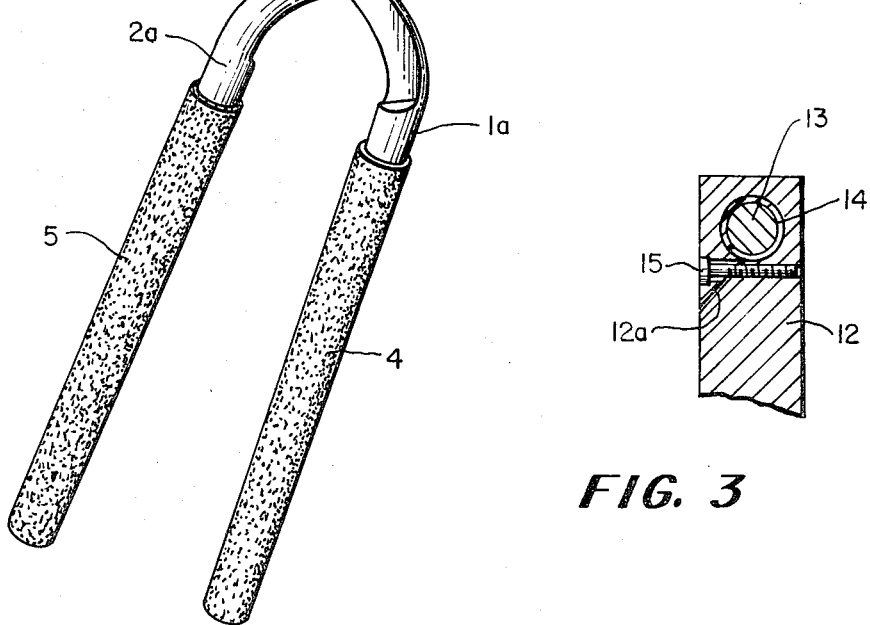
FIG. 3 is an enlarged longitudinal section on the line 3—3 of FIG. 1.

The drill rod 1 carries on its outer end a solid jaw 6 of substantially square cross-section having a transverse bore adjacent its outer end receiving one of the copper electrodes 7 from a welding machine. As shown in FIGS. 1 and 3, a slot 6a extends from the outer face of the solid jaw 6 and terminates within the bore for the electrode 7, the slot 6a being inclined and the edges of the slot being compressible by means of an Allen bolt 8 transfixing the slot 6a. The electrode 7 is thus adjustably assembled in the bore of the solid jaw 6. A Teflon sleeve 9, FIG. 1, is disposed around the electrode 7 within the bore for safety insulation purposes.

The drill rod 2 is of less length than the drill rod 1 and carries on its outer end a pivot section 10 having spaced ears 10a as shown in FIG. 1 receiving a semi-circular rib 11 on a movable jaw 12, which jaw is pivotally connected to pivot section 10 by a pin 10b; and carries the other copper electrode 13 in a transverse bore in its outer end opposite but spaced from the electrode 7, the electrode 13 being mounted in the said bore with a Teflon sleeve 14 therearound, as shown in FIGS. 1 and 3. The movable jaw 12 also is provided with a diagonal slot 12 (FIGS. 1 and 3) identical with the slot 6a, the slot 12a being normally contracted by means of an Allen bolt 15 transfixing the slot 12a, whereby the electrode 13 may be firmly adjustably gripped within the movable jaw 12 and insulated therefrom.

The solid jaw 6 carries a dowel pin 16 of substantial diameter, the outer end of which slidably and snugly engages a corresponding bore in the movable jaw 12 so that when the handles 1a and 2a are squeezed together, or separated, the movable jaw 12 will move in parallel relation to the solid jaw 6. A spring 17 is disposed around the dowel pin 16 between the solid jaw 6 and the movable jaw 12, as shown, normally tending to separate the jaws 6 and 12.

The cables (not shown) from a welder are then attached to the copper electrodes 7 and 13 and the hand tool is set up to spot weld, the Teflon sleeves 9 and 14 around the electrodes being provided for insulation purposes, and the rubber insulation 4 and 5 on the handles 1a and 2a for safety precautions.

The spring 17 between the jaws 6 and 12, sliding on the dowel pin 16, acts to keep the jaws open and maintains the gap at which the electrodes 7 and 13 are set. The tool may be placed over two pieces of metal, and by squeezing the handles 1a and 2a, the pivot section 10 allows the movable jaw 12 to move against the solid jaw 6 in parallel relation, allowing the electrodes 7 and 13 to close over the metal pieces evenly.

My tool is designed to make work a lot easier for the worker. Existing spot welding machines are stationary machines usually attached to a bench, and when the worker has to spot weld he must lift the work on top of the bench to spot weld. However, my hand tool does the same job as the spot welding machine does, but eliminates the lifting of any work. The cables from any electric welder plug right into the jaws 6 and 12 of my hand tool, and all the welder has to lift is the hand tool itself, which is a lot lighter and easier to work with than when using the old spot welding machines.

The only adjustment necessary when using my tool is made at the electrodes 7 and 13 by moving them closer or further apart and locking them in place with the Allen bolts 8 and 15. The tool when squeezed at the handles moves the jaws together in a straight line. There is no angle or arc in the movement itself, as the gap between the electrodes over the metal to be welded closes evenly.

I claim:

1. A spot welding tool of the pliers type comprising a pair of crossed drill rod handles pivotally connected together; a solid jaw carried by one drill rod; a movable jaw pivotally connected to the other drill rod; a pair of opposed electrodes adjustably carried by and insulated from the said jaws respectively; means for adjusting the gap between the ends of the electrodes; and means connecting said jaws yieldably tending to separate the jaws whereby when the handles are squeezed together the movable jaw will move in parallel relation to the solid jaw allowing the electrodes to close over the work evenly.

2. In a tool as set forth in claim 1, electrical insulation material around the handles respectively.

3. In a tool as set forth in claim 1, a pivot section on said other drill rod having a pair of spaced ears; said movable jaw having a semi-circular rib disposed between said spaced ears; and a pivot pin extending through said spaced ears and rib.

4. A spot welding tool of the pliers type comprising a pair of crossed drill rod handles pivotally connected together; a solid jaw carried by one drill rod; a movable jaw pivotally connected to the other drill rod; a pair of opposed electrodes disposed in bores through the said jaws respectively; means for adjusting the gap between the ends of the electrodes; a pin of substantial diameter on the solid jaw snugly engaging a corresponding bore in the movable jaw; and a spring disposed around said pin between said jaws yieldably tending to separate the jaws, whereby when the handles are squeezed together the movable jaw will move in parallel relation to the solid jaw allowing the electrodes to close over the work evenly.

5. In a tool as set forth in claim 4, sleeves of electrical insulating material interposed between the electrodes and the bores therefor in said jaws; and electrical insulation material around the handles respectively.

6. In a tool as set forth in claim 4, said adjusting means comprising diagonally inclined slots in the jaws terminating at the bores for the electrodes; and bolts transfixing said slots.

7. In a tool as set forth in claim 4, a pivot section on said other drill rod having a pair of spaced ears; said movable jaw having a semi-circular rib disposed between said spaced ears; and a pivot pin extending through said spaced ears and rib.

* * * * *